United States Patent [19]

Spurgat

[11] Patent Number: 5,398,729
[45] Date of Patent: Mar. 21, 1995

[54] LOW PERMEATION FUEL HOSE

[75] Inventor: Jimmy C. Spurgat, Rawson, Ohio

[73] Assignee: Cooper Tire & Rubber Company, Findlay, Ohio

[21] Appl. No.: 934,262

[22] Filed: Aug. 25, 1992

[51] Int. Cl.⁶ .............................................. F16L 11/08
[52] U.S. Cl. ................... 138/133; 138/138; 138/144
[58] Field of Search ................ 138/131, 133, 138, 144

[56] References Cited

U.S. PATENT DOCUMENTS

| | | | |
|---|---|---|---|
| 133,219 | 11/1872 | Gately | 138/133 |
| 2,330,651 | 9/1943 | Welger | 138/133 |
| 2,551,038 | 5/1951 | Nebout | 138/131 |
| 2,676,127 | 4/1954 | Hansen | 154/83 |
| 4,099,425 | 7/1978 | Moore | 138/133 |
| 4,106,967 | 8/1978 | Logan et al. | 156/184 |
| 4,106,968 | 8/1978 | Kutnyak et al. | 156/189 |
| 4,205,034 | 5/1980 | Newberry | 264/103 |
| 4,330,017 | 5/1982 | Satoh et al. | 138/126 |
| 4,403,631 | 9/1983 | Abdullaev et al. | 138/133 |
| 4,518,018 | 5/1985 | Kutnyak et al. | 138/130 |
| 4,559,973 | 12/1985 | Hane et al. | 138/138 |
| 4,758,455 | 7/1988 | Campbell et al. | 138/138 |
| 4,881,576 | 11/1989 | Kitami et al. | 138/125 |
| 4,887,647 | 12/1989 | Igarashi et al. | 138/126 |
| 4,903,735 | 2/1990 | Delacour et al. | 138/133 |
| 4,925,710 | 5/1990 | Buck et al. | 428/34.5 |
| 4,950,436 | 8/1990 | Kitami et al. | 264/103 |
| 4,984,604 | 1/1991 | Nishimura | 138/126 |
| 5,038,833 | 8/1991 | Brunnhofer | 138/137 |

Primary Examiner—David A. Scherbel
Assistant Examiner—James F. Hook
Attorney, Agent, or Firm—Joseph G. Nauman

[57] ABSTRACT

A fuel hose is provided which can be cured into a predetermined shape and which contains a layer of material which, in the final form of the hose, provides a continuous barrier to permeation of fuel through the walls of the hose. A method of making such a hose is disclosed which includes steps added to known hose manufacturing methods, using a thin fuel impermeable tape, which may include a continuous metallic layers and which is wound helically about an inner uncured tubular rubber extrusion with the edges of the tape overlapping. The tape has a heat activated adhesive thereon which will function, when an outer uncured rubber layer is added and the composite uncured hose is placed in an autoclave for vulcanization, to form a continuous impermeable intermediate layer in the hose.

9 Claims, 3 Drawing Sheets

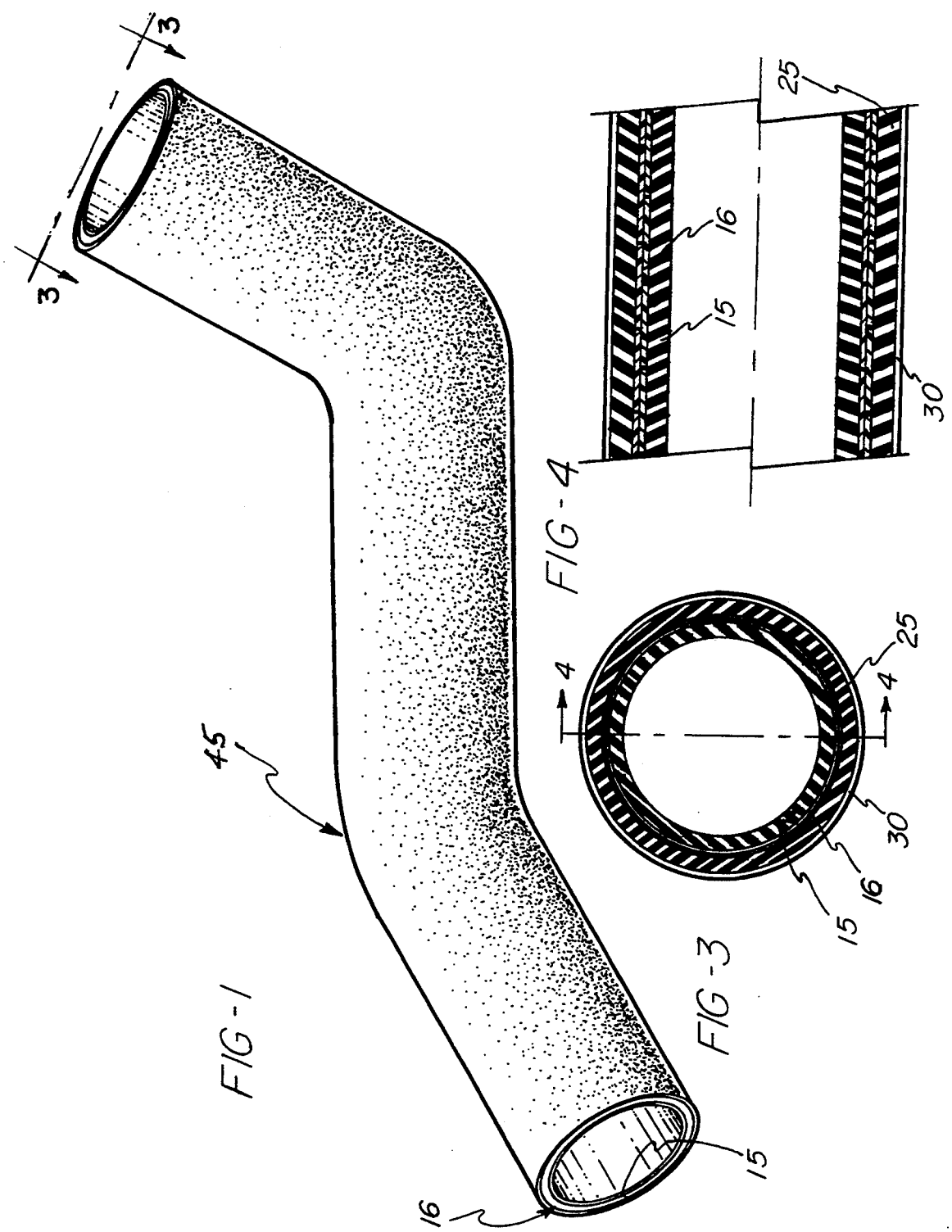

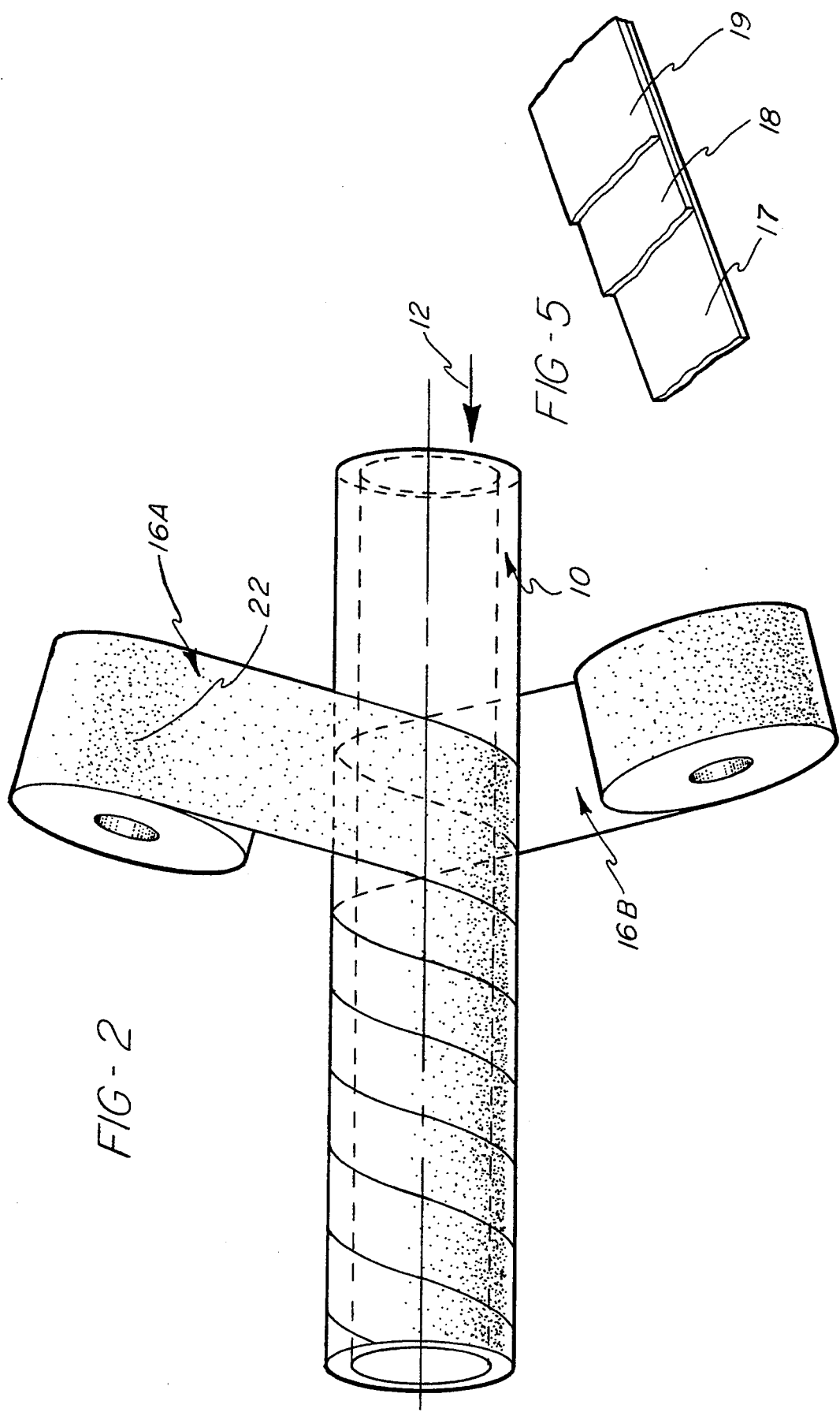

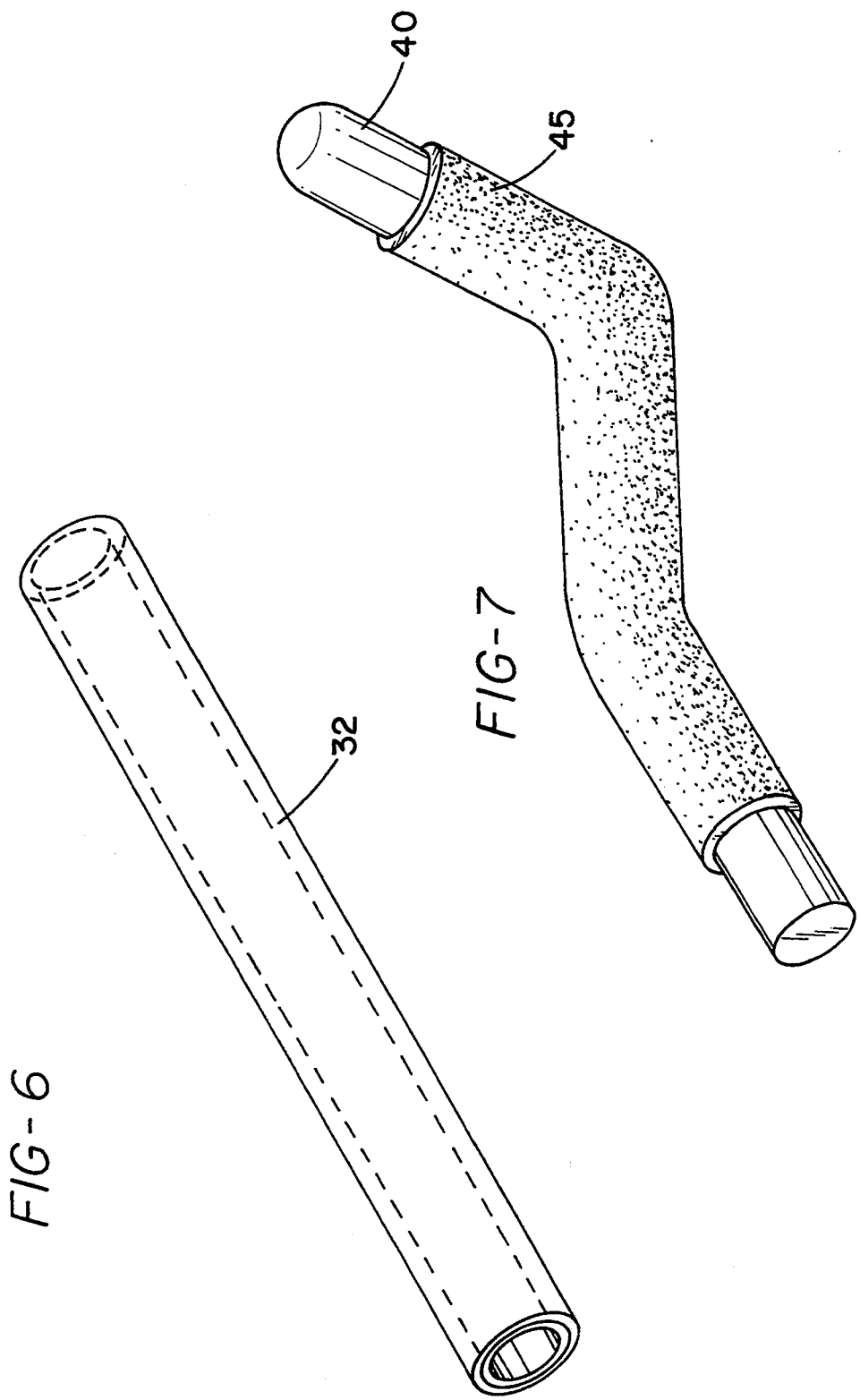

LOW PERMEATION FUEL HOSE

BACKGROUND OF THE INVENTION

This invention relates to specially constructed fuel hose for use in supply of automotive fuels, and particularly to such hose as used in automotive vehicles.

Regulation has been adopted in California, and are under active consideration elsewhere, which will require in a short time that new automotive vehicles sold in the state must pass a vehicle permeation test presently designated as the S.H.E.D. TEST, which test is designed to measure the emissions (i.e. vapors) from vehicles with the engine not running. Within a few years 100% of new vehicles sold in that state will be required to pass this standard. A maximum of 2 grams of vapor emission per 24 hours period is allowable. Obviously, these emissions will come from vaporization of fuel permeating the fuel hoses and other parts of the vehicle fuel supply system.

In addition to more stringent requirements for low emissions from static vehicles, automotive exhaust emission standards are becoming more stringent, and one of the efforts to meet such requirements is through the use of various blends of so-called "clean burning" fuels, which include large percentages of methanol or ethanol.

It is believed that these regulations may become Federally mandated, and therefore automotive manufacturers are seeking from parts suppliers various components with lower emission values and (as related to fuel hose) improved permeation resistance. Traditional solutions to improved fuel hose permeation resistance involve selecting specific rubber compounds which are known to exhibit low permeation characteristics and compounding those with other ingredients to achieve desired results. With the variety and mixture of fuels likely to be used in the near future, more stringent requirements are being placed on the performance of fuel hose. The rubber compounds can be tailored to give certain minimum permeation for a particular fuel, but unfortunately these levels are still well above anticipated future standards. In addition, a compound tailored for minimum permeation when subjected to one specific fuel will often exhibit marginal results when subjected to other fuels or combinations of them.

More recent solutions to fuel hose permeation problems involve the use of fluoroelastomers, which generally exhibit very low permeation values even for the variety of fuels mentioned above. However, there are drawbacks inherent in the use of fluoroelastomers in an efficient cost effective hose production environment. These polymers are very expensive, ten to twenty times as expensive as traditional rubber polymers used for hoses. For this reason fluoroelastomers are normally produced by extrusion as a very thin wall tube in a co-extrusion process which also simultaneously forms a thicker layer of low permeability rubber compound around the fluoroelastomer tube. It is important that these two co-extruded tubes have good adhesion to each other so a resulting product made from them can be processed through the remaining manufacturing steps and insure good integrity of the finished product, to withstand normal in-service abuse. Unfortunately, fluoroelastomers do not have tack (surface stickiness) in their uncured state to permit them to bond to adjacent layers of uncured rubber. Processing difficulties occur when these layers do not adhere together, resulting in unacceptable amounts of scrap material.

Additional processing difficulties arise as a direct result of the cost of fluoroelastomers and the interest in minimizing the amount used. Thicknesses of 0.020 to 0.040 inch are sufficient to achieve low permeation resistance levels, but because of the small opening in the extrusion tool (die) needed to produce such thickness, difficulties arise from inevitable foreign material found in rubber compounds, which cause die openings to plug. This can result in a tear in the fluoroelastomer layer, allowing a direct path for passing fuel to the outer layer of higher permeation rubber. Because the inner co-extruded fluoroelastomeric layer cannot be seen during the production process, considerable scrap can be encountered or defective product is made and not easily discovered.

Fluoroelastomer compounds tend not to be viscous at the typical processing temperatures for rubber compounds. This property, combined with the need for small opening in the co-extrusion die to conserve the expensive material, results in high back pressure in the extruder. The extrusion equipment is thus placed under greater stress, which contributes to more rapid wear of the equipment.

SUMMARY OF THE INVENTION

The present invention provides a design and a unique method of manufacture of low permeability fuel hose, or the like, involving the use of a thin (0.001 to 0.003 inch) layer of either a metallic/plastic laminate or metal tape, together with a heat activated adhesive. The laminate or tape is contained as a barrier between inner and outer layers of typical low cost fuel hose rubber compounds. Conventional methods of hose production can be used regardless of the choice of barrier material.

According to the inventions a continuous tube of rubber is extruded in an axial direction, and this becomes the inner wall or layer of the finished hose. The application of the low permeation barrier laminate or tape takes place by circumferentially wrapping a narrow tape of the barrier material around the moving tube of extruded rubber. This causes barrier material to be applied in a spiral fashion along the length of the tube. The application of barrier material is accomplished in such manner as to ensure overlapping of each successive wrap around the tube, thus allowing the pre-applied heat activated adhesive to bond the barrier material together when the hose takes its final shape during the autoclave vulcanization step.

The remaining steps in the manufacturing of this low permeation fuel hose are the same as in making conventional fuel hose. A suitable reinforcement, depending on the specific end use for which the product is intended, may be applied in a continuous fashion over the top of the wrapped barrier layer. This is followed by covering of the composite inner tube, barrier layer wrap, and reinforcement (if used) with an outer layer of rubber compound to contain the reinforcing and barrier elements of the tube. The continuous length is then cut to predetermined lengths and these lengths are pushed onto round bars (mandrels) of such diameter as to fit the inside hose diameter. The mandrels are bent to a desired shape and act as forms to hold the hose during the subsequent vulcanization process.

The pre-applied heat activated adhesive of the low permeability wrap permits movement and alignment of the spirally wrapped, overlapped barrier tape as the hose length is pushed onto the bent mandrel. As heat from the autoclave penetrates the hose, the adhesive activates and bonds the barrier layer to itself and to the rubber compounds. Sufficient resiliency remains in the adhesive before the hose cools to ambient temperature after being taken from the autoclave to permit removal of the vulcanized hose from the mandrel without destroying the adhesive bond.

Accordingly, the principal object of this invention is to provide a fuel hose which can be cured into a predetermined shape and which contains a layer of material which, in the final form of the hose, provides a continuous barrier to permeation of fuel through the walls of the hose; to provide a method of making such a-hose which includes easy to accomplish steps added to known hose manufacturing methods; to provide such a method using a thin fuel impermeable taped which may include a continuous metallic layer, and which is wound helically about an inner uncured tubular rubber extrusion with the edges of the tape overlapping, and which has a heat activated adhesive thereon that will function, when an outer uncured rubber layer is added and the composite uncured hose is placed in an autoclave for vulcanization, to form a continuous impermeable intermediate layer in the hose.

Other objects and advantages of the invention will be apparent from the following description, the accompanying drawings and the appended claims.

BRIEF DESCRIPTION OF THE DRAWINGS

FIG. 1 is a perspective view of a section of fuel hose constructed in accordance with the invention;

FIG. 2 is a schematic representation of the spiral wrapping of barrier material about a tubular extrusion, according to the invention;

FIG. 3 is a cross-section, on an enlarged scale, taken on line 3—3 of FIG. 1;

FIG. 4 is a partial longitudinal cross-section view through a segment of the hose;

FIG. 5 is a perspective view of a segment of tape with portions of its layers removed;

FIG. 6 is a perspective view of an uncured length of hose according to the invention, and FIG. 7 is a perspective view showing a length of the uncured hose placed on a mandrel prior to vulcanizing and forming into a predetermined shape as defined by the mandrel.

DESCRIPTION OF THE PREFERRED EMBODIMENT

FIG. 1 shows, in somewhat simplified form, a multi-layer fuel hose of the type with which this invention is concerned. It will be noted that the hose has a plurality of angular bends which symbolize various shapes which are prescribed, and built into the cured hose configurations, according to the needed routing of the hose in a fuel supply system of a vehicle. In other words, attachment of a particularly formed hose from a fuel filler neck to a fuel tanks or from a fuel tank to an engine (or its fuel pump) will result in that hose following the necessary route for such hose. The completed, vulcanized hose will have the predetermined shaped while still retaining some flexibility.

Referring to Figs. 2 and 3, a continuous tube 10 of rubber is extruded in an axial direction (indicated by arrow 12), and this becomes the inner wall or layer 15 of the finished hose (FIG. 1). Application of the low permeation barrier laminate takes place by circumferentially wrapping a narrow tape 16 of the barrier material around the moving tube 10 of uncured rubber material. This causes barrier material to be applied in a spiral fashion along the length of such tube. In certain instances, a pair of tapes 16A, 16B (see FIG. 2) may be applied to secure the desired wrap angle and coverage. The application of barrier material is accomplished in such manner as to ensure overlapping of each successive wrap around the tube.

Tape 16 may be formed of multiple layers of high permeability materials. In a preferred embodiment (FIG. 5), tape 16 has a polyester (or the like) base 17 and at least one layer 18 of thin flexible metal, for example aluminum, deposited thereon. The entire tape may typically have a thickness in the order of 0.001 to 0.003 inches (0.0254 to 0.0762 mm) and has a layer or coating 19 of a heat activatable adhesive on at least one of its exterior surfaces. Another suitable form of tape has the same general dimensions, but does not include the polyester layer. These tapes, due to the metal (aluminum) layer, present a theoretical zero permeation, provided pinholes through the thin metal can be avoided, and assuming good integrity of the overlap. The overlapping of the wound tape also minimizes the potential of exposed undetected pinholes. The polyester layer will provide further assurance against a fuel vapor path through the metal foil via an undetected pinhole.

The foil laminates and tapes are available from Neptco Incorporated, 30 Hamlet St., Pawtucket R.I.

A suitable reinforcement layer 25, depending on the specific end use for which the product is intended, may be applied in a continuous fashion over the top of the wrapped barrier layer. Such a layers which is per se known in this art, may include strands or mesh of reinforcement materials. Then, around the composite of inner tube 15, barrier layer wrap 16, and reinforcement 25 (if used), there is formed an outer layer 30 of uncured rubber compound to contain the reinforcing and barrier elements of the uncured hose which is shown in FIG. 6. At this stage in its constructions the hose 32 is ready for placement on a suitable shaped mandrel, after which it is vulcanized.

The remaining steps in the manufacturing of this low permeation fuel hose are the same as in making conventional fuel hose. The uncured hose 32 is separated into lengths of desired dimension, and these lengths are pushed onto mandrels 40, which are metal bars, usually of circular cross-section, having an exterior dimension to fit within the inner layer or tube 15. Mandrels 40 are bent to a desired shape and act as forms to hold hose 32 during the subsequent vulcanization process wherein the mandrel supported hose 32 is placed in an autoclave (or equivalent) s the rubber parts 15 and 30, and any optional reinforcement layer 25, are cured and the hose takes a predetermined shape for routing it through and around various parts of a vehicle to which the hose will be fitted. When the parts have cooled, mandrel 40 is removed, leaving the final cured and shaped length of hose 45 (FIG. 1).

The pre-applied heat activated adhesive of wrap 16 permits movement and alignment of the spirally wrapped, overlapped barrier tape as the hose length is pushed onto the bent mandrel. As heat from the autoclave penetrates the hose, the adhesive activates and bonds the barrier layer to itself and to the rubber compounds. Thus, the pre-applied heat activated adhesive bonds the barrier material together as a continuous high permeability layer within the resultant cured and formed hose. Sufficient resiliency remains in the adhesive before the hose cools to ambient temperature after being taken from the autoclave to permit removal of the vulcanized hose from the mandrel without disrupting this adhesive bond.

While the method and hose product herein described constitute preferred embodiments of the invention, it is to be understood that the invention is not limited to this precise process or method and the exact hose product, and that changes may be made therein without departing from the scope of the invention which is defined in the appended claims.

What is claimed is:

1. The method of producing a shaped low permeability hose for use in handling volatile fuels and the like, comprising the steps of extruding a tubular uncured rubber inner member, wrapping a layer of low permeability tape in helical fashion around the inner tubular member, the tape having at least one layer which is essentially impermeable to liquid contained therein, the tape having associated with it a heat activatable adhesive to adhere to itself and to adjacent layers of material, adding an outer layer of uncured rubber to complete a length of uncured hose, then heat curing the hose to a predetermined shape and thereby activating the adhesive to bond the wound layer of tape to complete a layer which is impermeable to the contained fuel within the cured shaped hose.

2. The method defined in claim 1, wherein the tape includes a heat-activatable adhesive on at least one of its surfaces.

3. The method defined in claim 2, wherein the tape is formed at least partially of a thin flexible metal which is impervious to fuels and other liquids intended to be confined within the hose.

4. In a method of producing a low permeability hose formed to a predetermined shape for use in handling volatile fuels and the like, wherein continuous inner and an outer layers of uncured rubber are joined around an intermediate layer, and the combined layers are then formed to a predetermined shape and cured, the improvement comprising forming the intermediate layer by winding a fuel impermeable tape around the inner layer with the edges of the tape overlapping, the tape having a property of being heat activatable on at least one of its surfaces whereby during the curing step the wound layer of tape then forms a continuous impermeable barrier to fuel contained within the inner layer of the resulting hose and capable of permeating the inner layer.

5. The method defined in claim 4, wherein the tape includes a heat-activatable adhesive on at least one of its surfaces.

6. The method defined in claim 4, wherein the tape is formed at least partially of a thin flexible metal which is impervious to fuels and other liquids intended to be confined within the hose.

7. A shaped hose for fuel lines and the like required to contained fuel under ambient conditions which may cause the fuel to permeate the material of the hose and vaporize from the exterior of the hose, said hose comprising an inner layer of rubber, an outer layer of rubber, an intermediate layer, between said inner and outer layers, said intermediate layer including a thin tape of a material which is impermeable to the fuel, said tape being wound about said inner layer with the edges of said tape overlapping, said tape being adhered to itself at its overlapping edges, and to at least one of said inner and outer layers, during the process of curing a length of the hose to its predetermined irregular shape to provide a continuous impermeable barrier against permeation of fuel through the walls formed by the layers of the hose.

8. A hose as defined in claim 7, wherein
said tape includes a heat-activatable adhesive on at least one of its surfaces.

9. A hose as defined in claim 7,
said tape being formed at least partially of a thin flexible metal which is impervious to fuels and other liquids intended to be confined within the hose, said metal tape in its spiral wound condition presenting an impermeable barrier to fuel contained within the hose.

* * * * *